(12) United States Patent
Gao et al.

(10) Patent No.: US 8,218,467 B2
(45) Date of Patent: Jul. 10, 2012

(54) METHOD AND APPARATUS FOR OPTIMIZING IDLE MODE STAND-BY TIME IN A MULTICAST SYSTEM

(75) Inventors: Ying Gao, San Diego, CA (US); Daniel Carson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 496 days.

(21) Appl. No.: 12/556,552

(22) Filed: Sep. 9, 2009

(65) Prior Publication Data

US 2010/0091695 A1 Apr. 15, 2010

Related U.S. Application Data

(60) Provisional application No. 61/097,165, filed on Sep. 15, 2008.

(51) Int. Cl.
*G08C 17/00* (2006.01)
(52) U.S. Cl. ........................ 370/311; 370/312; 455/343.2
(58) Field of Classification Search .................. 370/310, 370/311, 312; 455/130, 227, 334, 343.1, 455/343.2
See application file for complete search history.

(56) References Cited

U.S. PATENT DOCUMENTS 8,089,855 B2 * 1/2012 Agrawal et al. ............... 370/208
2007/0232366 A1 * 10/2007 Chen et al. .................... 455/574

FOREIGN PATENT DOCUMENTS

| EP | 1701221 | 9/2006 |
| WO | WO2006099149 | 9/2006 |
| WO | WO 2006099149 A1 * | 9/2006 |

OTHER PUBLICATIONS

International Search Report & Written Opinion—PCT/US2009/056757, International Search Authority—European Patent Office—Dec. 4, 2009.

* cited by examiner

*Primary Examiner* — Chi Pham
*Assistant Examiner* — Weibin Huang
(74) *Attorney, Agent, or Firm* — Ryan N. Farr (57) ABSTRACT

Methods and apparatus for optimizing idle mode stand-by time in wireless device operable in a multicast system are disclosed. In order to maximize or optimize the stand-by time for idle mode, a time line for decoding of overhead information symbol (OIS) data received in one or more superframes in the wireless device. Based on the determined time line, an offset time period can be determined for setting an idle mode timer period used by the wireless device to decode the OIS information. By offsetting the timer period, a wireless device can be ensured to wake up and prepared to latch OIS information before the start of a superframe boundary, thus minimizing the wake up time of the device operating in an idle mode and, in turn, optimizing stand-by time.

48 Claims, 7 Drawing Sheets

METHOD AND APPARATUS FOR OPTIMIZING IDLE MODE STAND-BY TIME IN A MULTICAST SYSTEM

CLAIM OF PRIORITY UNDER 35 U.S.C. §119

The present application for patent claims priority to Provisional Application No. 61/097,165 entitled "METHOD OF DECREASING STAND-BY TIME IN IDLE MODE ON MEDIA FLOW" filed Sep. 15, 2008, and assigned to the assignee hereof and hereby expressly incorporated by reference herein.

BACKGROUND

1. Field

The present disclosure relates generally to methods and apparatus for optimizing idle mode stand-by time (i.e., increasing the stand-by time) in a multicast communication system, such as a Forward Link Only (FLO) system, and more specifically to optimizing idle mode stand-by of a wireless device through adjusting of a monitor cycle time to ensure a system optimally wakes up at a time to begin processing information in a FLO superframe to thereby avoid extra wakeup time.

2. Background

Multicast communication systems, such as Forward Link Only (FLO) system, multicast several services, each of which is an aggregation of one or more independent data components. Each independent data component of a service is called a flow, and the flow may be a components such as video, audio, text or signaling components of the service. The transmitted signal in multicast systems such as FLO or digital video broadcast (DVB) systems, for example, is organized into superframes. Each superframe has the duration of predetermined period, such as one second duration in the case of FLO. Further, within the Physical layer of each superframe are various Physical layer channels including Overhead Information Symbol (OIS) channels and data channels.

The OIS channel carries important system information sent out by network to receiving devices, such as mobile wireless devices. The OIS channel information changes as system information is changed periodically, even from superframe to superframe. Thus, receiving devices in a multicast system must frequently process the OIS channel to refresh current system information. In mobile wireless devices having a limited amount of power resources, however, idle modes are utilized to save power resources by allowing the device to be put into a low power mode, sleep mode or power off mode. Because OIS information needs to be refreshed at least periodically, the mobile device is periodically awakened from sleep using an idle mode timer to receive, decode, and process the OIS information and then may be put back to sleep. The periodicity of this wakeup, termed herein as "min monitor cycle," is used by a device to obtain the OIS information during idle mode operation.

In certain FLO systems, a timer used to timeout the min monitor cycle has a set predetermined period (which may toll over multiple superframe periods) set by software (or processor or DSP running the software) after processing of OIS information from a superframe without regard to current time. Without considering the current time when the software is setting the timer, the resolution of the min monitor cycle period, which is typically in seconds due to the standard superframe duration, may cause up to 1 second extra of wake up time if hardware decoding the OIS misses a latch point for OIS decoding after the system is woken up from sleep mode, thus using extra power resources. Accordingly, an improved minimization of power consumed during the min monitor cycle for OIS decoding is desirable for optimizing power resources to thereby increase the phone standby time (i.e., how long the device can stay powered on when it is in idle mode before running out of power).

SUMMARY

In an aspect, a method for use in a wireless device operable in a multicast communication system to maximize stand-by time of the device operable with an idle mode is disclosed. The method includes determining a time line for decoding of overhead information symbol (OIS) information received in one or more superframes in the wireless device. The method also includes determining an offset time period used for setting a timer period used by the wireless device to decode the OIS information based on the determined time line.

According to another aspect, an apparatus for use in a wireless device operable in a multicast communication system to maximize stand-by time of the device operable with an idle mode is disclosed. The apparatus includes means for determining a time line for decoding of overhead information symbol (OIS) information received in one or more superframes in the wireless device, and means for determining an offset time period used for setting a timer period used by the wireless device to decode the OIS information based on the determined time line.

In yet another aspect, an apparatus for use in a wireless device operable in a multicast communication system to maximize stand-by time of the device operable with an idle mode is disclosed. The apparatus includes at least one processor configured to determine a time line for decoding of overhead information symbol (OIS) information received in one or more superframes in the wireless device. The processor is also configured to determine an offset time period used for setting a timer period used by the wireless device to decode the OIS information based on the determined time line.

In a final aspect, a computer program product including a computer-readable medium is disclosed. The medium includes code for causing a computer to determine a time line for decoding of overhead information symbol (OIS) information received in one or more superframes in a wireless device operable in a multicast communication system. The medium further includes code for causing a computer to determine an offset time period used for setting a timer period used by the wireless device to decode the OIS information based on the determined time line to maximize stand-by time of the wireless device which is operable with an idle mode.

DETAILED DESCRIPTION

Apparatus and methods disclosed herein address the situation where when a mobile device is on standby, the device wakes up periodically to monitor the OIS according to a Min-monitor cycle, wake up after a superframe starts causes the device to fail to latch on the OIS and remain powered on until a next superframe (approximately a 1 second delay) thereby wasting energy resources. This due to the fact that the OIS is located at the beginning of the superframe structure and takes up only about 10 symbols out of a thousand or more symbols of the superframe, and thus OIS programming can only be latched at the superframe boundary. Accordingly, by determining the OIS time line including software and hardware latencies inherent to the device, the min monitor cycle period can be offset to ensure that wireless device is woken up and ready to hardware latch on the OIS prior to the superframe boundary.

For purposes of this disclosure, it is noted that the term "idle mode" may be understood as including modes such as a low power mode, sleep mode, or power down mode. Furthermore, the term "sleep mode", in particular, may means either a low power operation where some or all components in wireless device are either put into a low power operation or, alternatively, a power down mode or condition where at least some components in a wireless device are powered down completely. Furthermore, the terms "awaken", "wake up" and other similar terms are understood to be inclusive of waking up from a power down condition where powered down components are powered up, or transitioning from a low power mode to a higher power or active mode.

Figure 1:
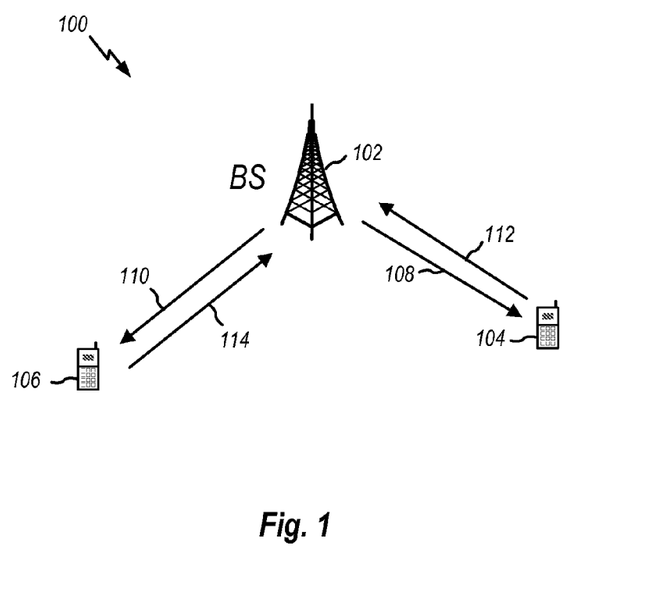
FIG. 1 illustrates a communication system, such as a FLO system, in which the presently disclosed apparatus and methods are implementable.

According to an aspect, FIG. 1 illustrates a wireless communication system 100 in which the presently disclosed methods and apparatus may be employed. In an aspect, the system 100 may be a Forward Link Only (FLO) system or some other multicast system, such as a DVB-H or Digital Multimedia Broadcasting (DMB) systems. A base station 102 may broadcast multicast services information to one or more mobile devices (e.g., 104, 106) over forward links 108, 110. The transmitted information is arranged in communication frames to packetize the data, and in particular superframes, as will be discussed below. The devices 104, 106 may also transmit information on reverse links as illustrated by arrows 112, 114.

Base station 102 may be a fixed station used for communicating with the terminals 104, 106 and may also be referred to as an access point, a Node B, or some other terminology. The mobile devices 104, 106 may also be called access terminals, user equipment (UE), wireless communication devices, terminals, access terminals, mobile handset, or some other terminology.

Figure 2:
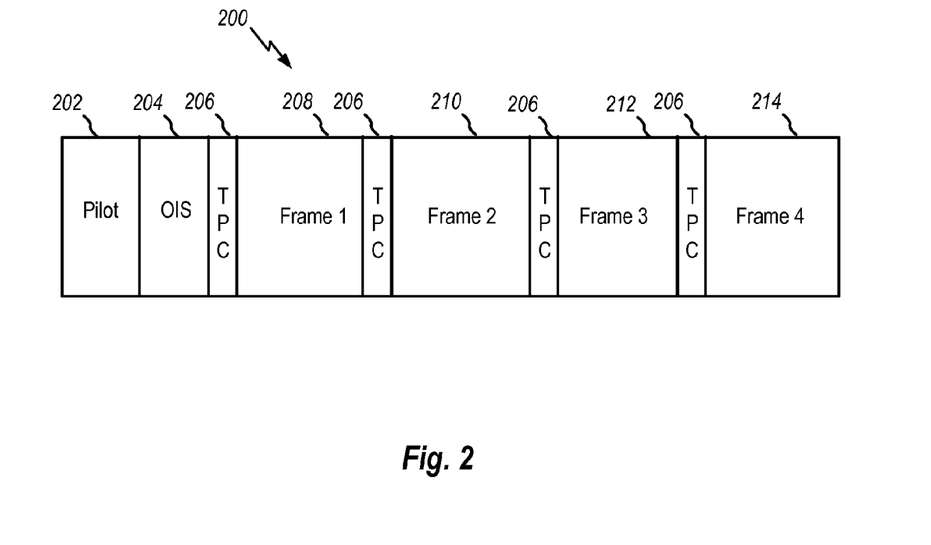
FIG. 2 illustrates an exemplary physical layer structure of a superframe used in the system of FIG. 1 to show the location and relationship of the OIS channel and data channel in the superframe structure.

As mentioned above, the transmitted signal in a FLO system is organized into superframes. FIG. 2 shows a superframe 200 that illustrates the general structure and the time relationships (which is not to scale) between the various physical layer channels in a FLO superframe. The superframe 200 has various pilot channels 202 occurring first in time in the superframe (where the x axis direction represents time passage, and the y direction tones or frequencies). After the pilot channels 202, OIS channels 204 follow in time. After the pilot and OIS information, four data frames 208, 210, 212, and 214 are used to convey the data channels. Additionally, a typical FLO superframe will include transition pilot channels (TPC) 206 to differentiate between the four data frames. It is noted that in the MediaFLO system, as one example, each superframe has a time duration of one second.

Since the OIS 204 is located at the beginning of the superframe and takes up only about 10 symbols out of a thousand or more symbols of the superframe 200, and the OIS programming can only be latched at the superframe boundary, it is important for the system to wake up at the right place, just early enough to decode OIS and go back to sleep immediately after decoding the OIS.

Figure 3:
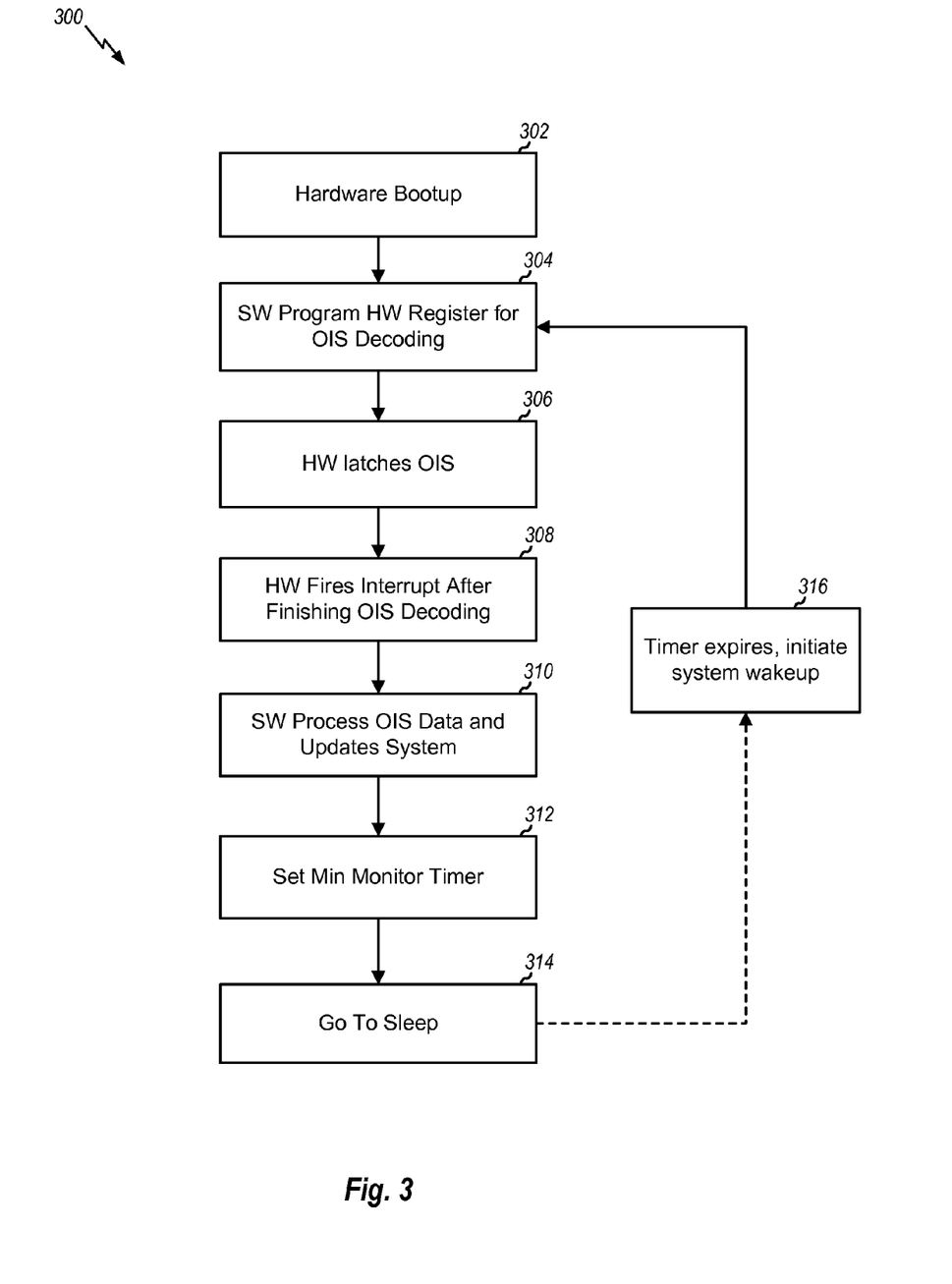
FIG. 3 is a flow chart of the procedure for the min-monitor cycle for the OIS decoding for a wireless communication device operable with an idle mode.

The implementation of the OIS decoding cycle or "min monitor cycle" is illustrated by exemplary method 300 illustrated in FIG. 3. As illustrated, the method 300 may include boot up of hardware, such a MediaFLO chip as an example for a FLO system as illustrated by block 302. It is noted that this process in block 302 does not necessarily always need to be repeated after each OIS decoding. At block 304, software or a processor running software serves to program the hardware to register for OIS decoding, after which the hardware latches onto to the OIS to effect OIS decoding after a superframe has started as illustrated by block 306.

After the decoding of the OIS by the hardware is complete, the hardware fires an interrupt signal as illustrated in block 308. The interrupt, in turn, is used by the software or processor running software to further process the OIS data decoded, such as for updating the system information in the device as illustrated by block 310. Additionally, the software or process is also configured to set a timer (or reset if previously set), such as a Min monitor timer that determines the period before a next wakeup for OIS decoding as illustrated in block 312. As will be discussed further below, if the time period of this timer is simply a fixed time without regard to the current time of OIS processing, a next wakeup period may result in extra time and power usage for the next OIS decoding.

After the timer is set in block 312, flow then proceeds to block 314 where the device is put into sleep mode. When the timer expires as indicated by a block 316, the system or device is woken up and the process is repeated for the next OIS decoding as indicated by the return to block 304.

As briefly mentioned before, if the min monitor timer period is set without consideration of the current time when the software is setting the timer, the resolution of Min monitor cycle period, which is in seconds, can cause up to a 1 second extra of wake up time in the subsequent OIS decoding. An illustration of this scenario is shown in, FIG. 4. As shown, a timer is set at point 402, which occurs at a time after a hardware fires an OIS interrupt (called time "t" that is the measure of time elapse from a superframe boundary 403 (hereinafter SF boundary) at the start of the current superframe 404 to the interrupt firing) and the software processes the OIS data (called time "s" that is a measure of time the software takes to process the OIS data). Thus, the timer set point 402 is at t+s time after the beginning of the superframe (i.e., SF boundary 403).

Figure 4:
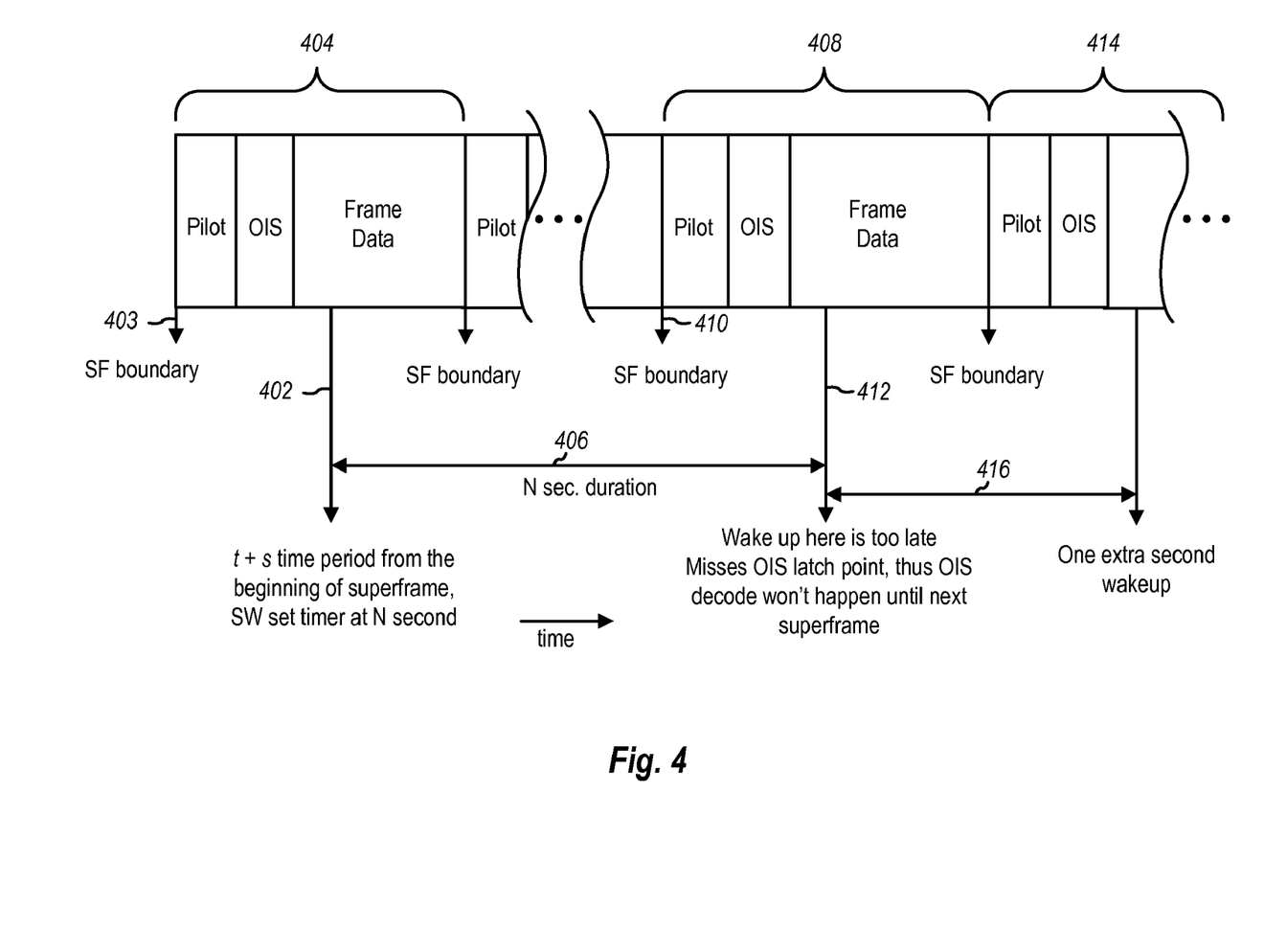
FIG. 4 illustrates a scenario of a timer setting where the time wakes up too late and misses the latch point of the OIS programming, thereby resulting extra wake up time.

In the scenario of FIG. 4, the timer is typically set to a value N, which is a predetermined value usually in expressed in dimension of seconds since each superframe is 1 second duration. In particular, N may be an integer value that is predetermined according to the multicast system settings and may traverse time passage of a multiple number of superframes. After the time is set, the device is put to sleep also at essentially point 402. After duration of an integer value N seconds (not shown to scale in FIG. 4), the device is awoken from the sleep mode. Since the value N is an integer second value, this time from sleep at point 402 will cause the hardware in a device to miss the hardware latch point (i.e., superframe boundary 410) for OIS decoding of a current superframe (e.g., 408). In particular, when the system wakes up after the superframe boundary 410 at point 412 after the OIS channel has occurred, the hardware has to stay awake until latching of the OIS programming and decoding of the OIS can be performed in the next superframe (e.g., 414). This additional awake time may be approximately 1 second of extra wake up time (shown by arrow 416) in a MediaFLO system, as one example.

In light of the foregoing problem, the presently disclosed apparatus and method include adjustment or "offset" of the timer period N with a determined offset time period. It is noted here that the term "offset" as used herein means to reduce the time period N by the determined offset time period, thus effectively causing an "offset" of a wakeup time relative to a superframe boundary in a next wake up period in the min monitor cycle. It is noted that the OIS is located at the beginning of the superframe structure and takes up only about 10 symbols out of a thousand or more symbols of the superframe. Thus, OIS programming can essentially only be latched at the superframe boundary (e.g., 410). Accordingly, by determining the OIS time line including software and hardware latencies inherent to the device, the min monitor cycle period can be offset to ensure that wireless device is ready to hardware latch on the OIS by ensuring power up of the hardware (See e.g., 302 in FIG. 3) and software programming of the hardware for OIS decoding (See e.g., 304 in FIG. 3) in time for the OIS latch point (i.e., the superframe boundary).

Figure 5:
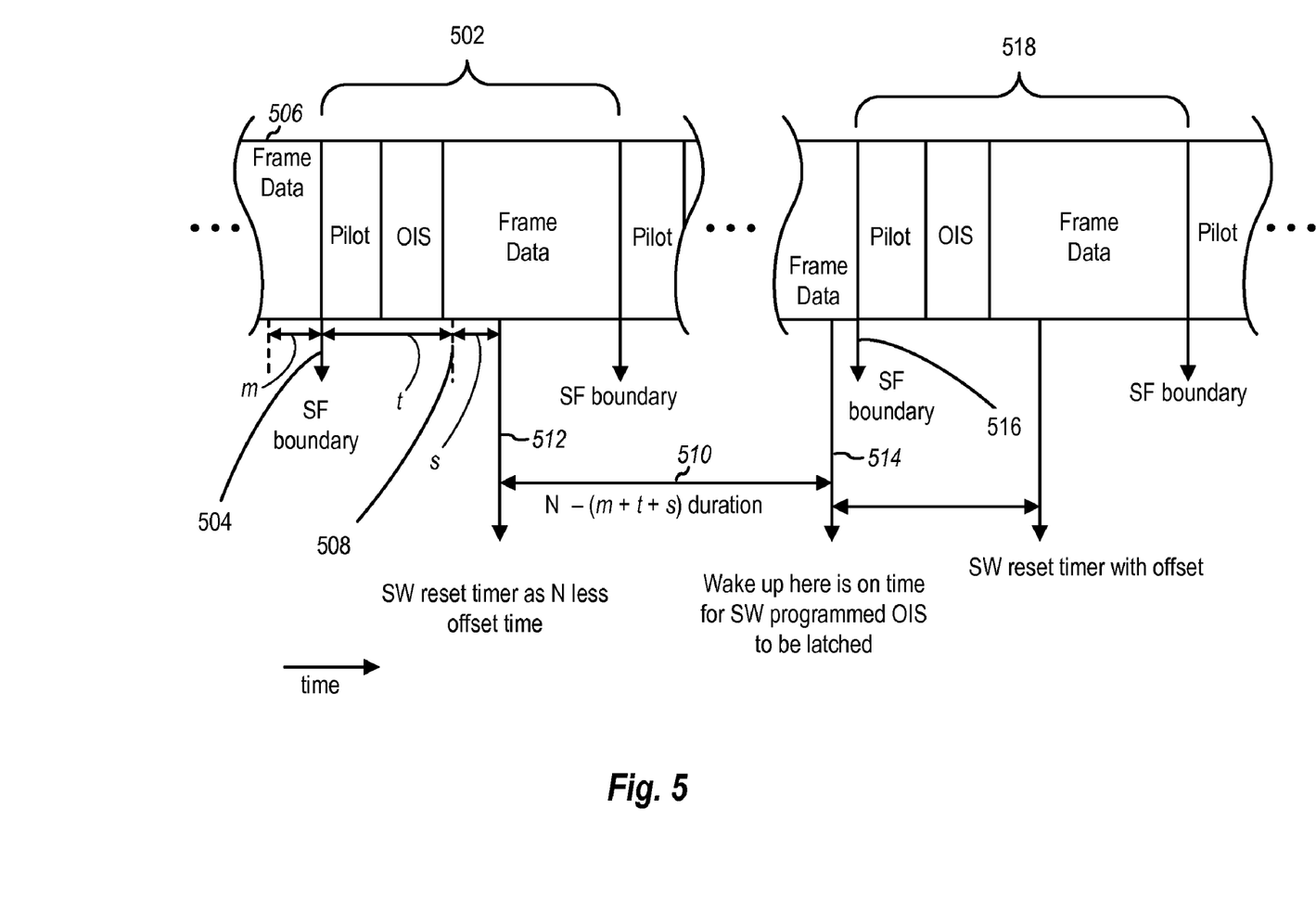
FIG. 5 is a schematic of the scenario of the timer set and expiring, and shows offset of the Min-monitor cycle duration to enable the system to wake up just early enough to decode the OIS.

This concept is illustrated in the scenario of FIG. 5. As shown in FIG. 5, in order to ensure that hardware will latch the OIS at first available superframe (502), dependent on the speed a particular device can wake up, the device should be wakened m milliseconds (ms) before the superframe boundary 504. This timing allows software or a processor running the software to program the hardware to decode the OIS (See e.g., block 304 in FIG. 3) and for the hardware to latch on to the OIS (See e.g., block 306 in FIG. 3).

After latching, the hardware decodes the OIS and subsequently fires the OIS interrupt at t ms from the beginning of the superframe (shown demarcated by the line referenced with number 508). It is noted that specific length of time t in FIG. 5 is merely exemplary, and that this time period is different for various different mobile wireless devices. After the interrupt is fired, the software requires some time s ms to process the OIS data and update the device or system (See e.g., block 310 in FIG. 3), after which the timer for timing the OIS min monitor cycle is reset (See e.g., block 312) before returning the device to sleep at time 512. In an aspect, the software or a processor running the software (e.g., a DSP or ARM) determines the OIS time line and bases the time period of the timer based on this determination. In particular, the OIS time line includes time periods m, t and s and the adjustment or offset of the min monitor timer period is calculate or determined based on these values. Specifically, the software resets the timer period 510 for the Min monitor timer as N−(m+t+s), where N is the N seconds as specified by the Min monitor cycle for the particular wireless system (e.g., MediaFLO) as discussed before. The offset m+t+s ms thus ensures that at the end of next Min monitor cycle 514 the device will wake up at the right place (e.g., prior to SF boundary 516 at the start of superframe 518) to avoid the extra wake up time (414) incurred in the scenario of FIG. 4.

It is noted here that term "determining the OIS time line", including determining the m, t and s values, may be effected by any one or numerous methods for observing, measuring, calculating or calibrating the time of the processes occurring during the OIS time line. Additionally, although stated above that these determinations are made by software, it is also noted that the hardware may also perform this determination, as well as a combination of both software and hardware.

In a more general sense, the presently disclosed methods and apparatus determine the OIS decoding timeline of a device operating with an idle mode, i.e., from the wake up to finish of the entire OIS decoding process including software and hardware latencies. By resetting the min monitor timer based on a determined OIS timeline, the presently disclosed methods and apparatus optimize power consumption on the device for OIS decoding by offsetting or accounting for these latencies. This is due, in particular, to offsetting based on accounting for the time to wake up the hardware, and the software latency in programming the hardware, as well as the hardware and software process time for OIS decoding. In one example, the time for these processes including the hardware wakeup sequence takes approximately 50 to 100 ms from the wake up to finish the entire OIS decoding and then go back to sleep (e.g., power down).

Figure 6:
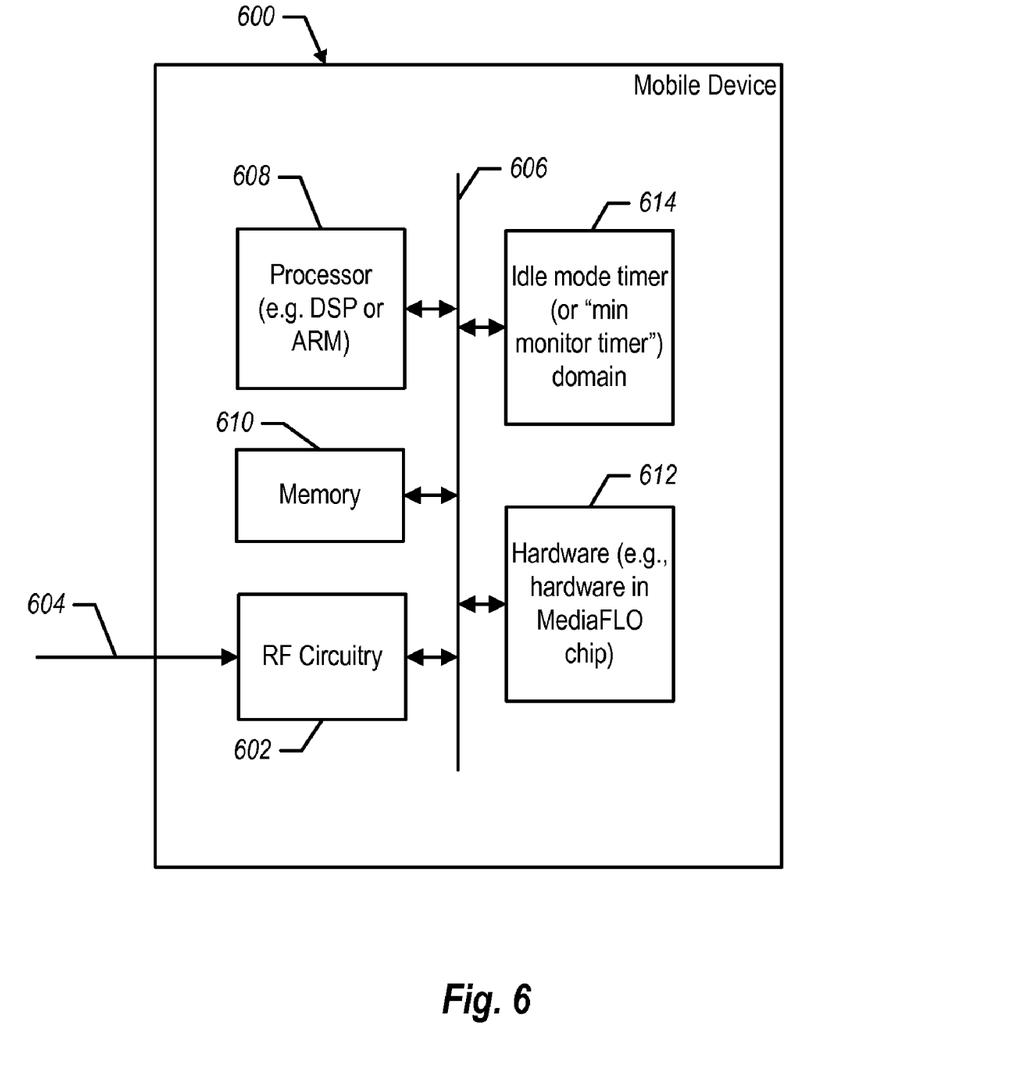
FIG. 6 illustrates a block diagram of an apparatus that optimizes idle mode stand-by time in a multicast system.

FIG. 6 illustrates a block diagram of an apparatus that optimizes idle mode stand-by time in a multicast system through the methodology disclosed herein. The apparatus, which may be implemented in a mobile device 600, includes RF circuitry 602 for at least receiving superframe transmissions 604 from a broadcast transmitter. The signals are communicated via a bus or equivalent communication coupling to various modules or portions of the mobile device 600.

The apparatus of FIG. 6 also includes at least one processor 608, which may be a DSP, ARM or other type of processor(s) configured to run software stored in a memory 610. Additionally, the apparatus in device 600 includes hardware 612, such as hardware in a MediaFLO chip to implement, among other things, OIS latching and decoding of OIS information in the received superframes. Finally, the apparatus of FIG. 6 includes an idle mode timer, or more specifically, a min monitor timer 614 that is operable in its own time domain. Thus, the timer 614, having its own time domain, may operate when the other portions of the mobile device 600 are put to sleep during idle mode operation.

In operation, the timer 614 initiates wakeup of the other portions of device 600 after the time has counted a sleep time (e.g., the min monitor time). According to the present methodology, the time counted by timer 614 is the time N less an offset time period (e.g., m+t+s). Software run by processor 608 includes software to program registers in the hardware 612 for OIS decoding (See e.g., block 304 in FIG. 3). Upon receiving a next superframe, the hardware will latch the OIS information and decode the information received in the RF circuitry 602 (See e.g., block 306 in FIG. 3). The hardware 612 will then fire an interrupt after it finishes decoding the OIS information, which is recognized by software running on processor 608. Processor 608 software will process the OIS data and update any relevant system parameters and information stored in device 600, such as in memory 610.

The software running on processor 608 may also determine the offset time period to offset the min monitor timer period. This offset and/or time period is the communicated to set timer 614. The processor and/or hardware may then imitate putting components in device 600 to sleep, excepting the timer 614, which operates to count out the sleep period before awakening for a next OIS decoding and processing.

Figure 7:
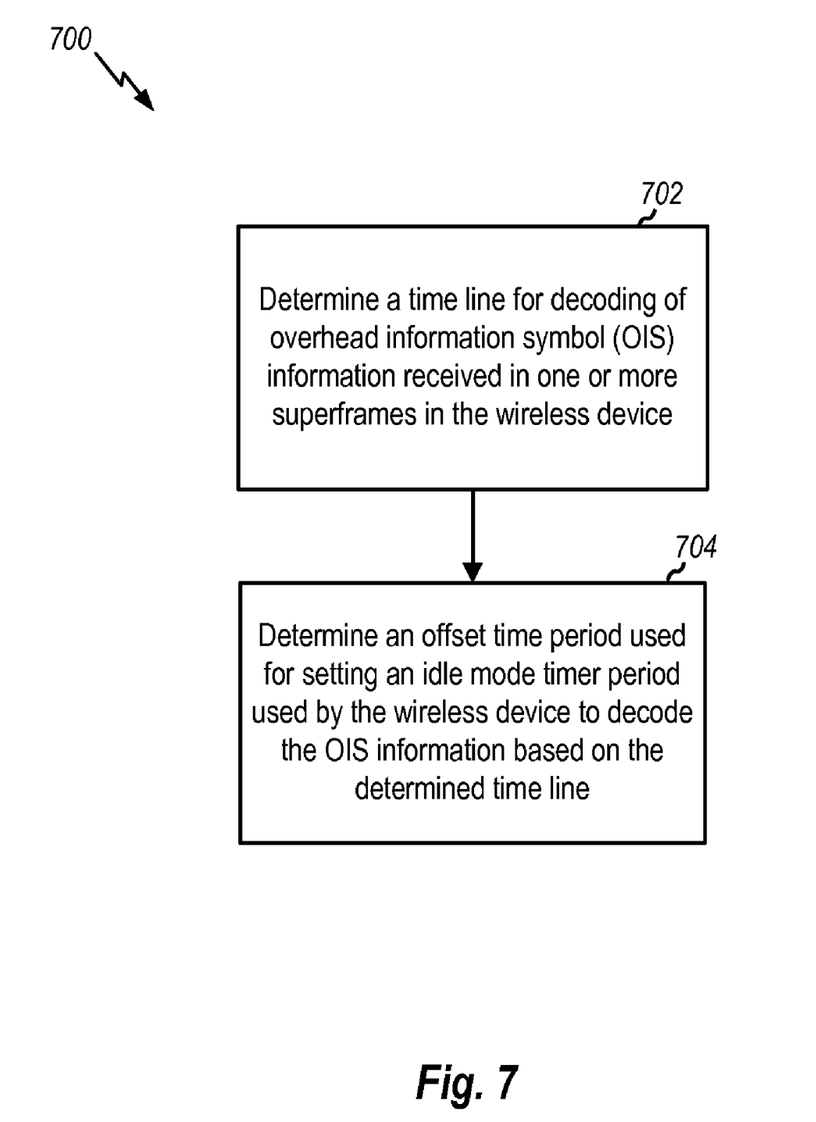
FIG. 7 illustrates another method that effects optimization or maximization of idle mode standby time in a wireless device in a multicast communication system.

FIG. 7 illustrates another method 700 that effects optimization or maximization of idle mode standby time in a wireless device in a multicast communication system. It is noted that method 700 may represent processes executed during portions of method 300 discussed above. As illustrated the method 700 includes a first block 702 wherein a time line is determined for decoding of overhead information symbol (OIS) information received in one or more superframes in the wireless device block 702. The processes of block 702 may be implemented by software running on a processor(s), such as processor 608, or a combination of hardware and software (e.g., software on processor 608 and hardware 612), as merely a couple ways of implementing this process. Furthermore, the processes in block 702 may be implemented at the end of software processing of OIS data, or during various processes occurring throughout the OIS decoding/processing (e.g., the processes of blocks 304, 306, 308, and 310 in FIG. 3) with culmination after all OIS processing is performed to determine the OIS processing time line.

After the OIS time line has been determined at block 702, flow proceeds to block 704 where an offset time period used for setting a timer period used by the wireless device to decode the OIS information based on the determined time line block is determined The processes of block 704 may be performed by software running on a processor, and may also be in part effected with the min monitor timer (e.g., timer 614). The processes of block 704 may be implemented prior to putting a device to sleep, such as the process of block 312 discussed earlier.

Figure 8:
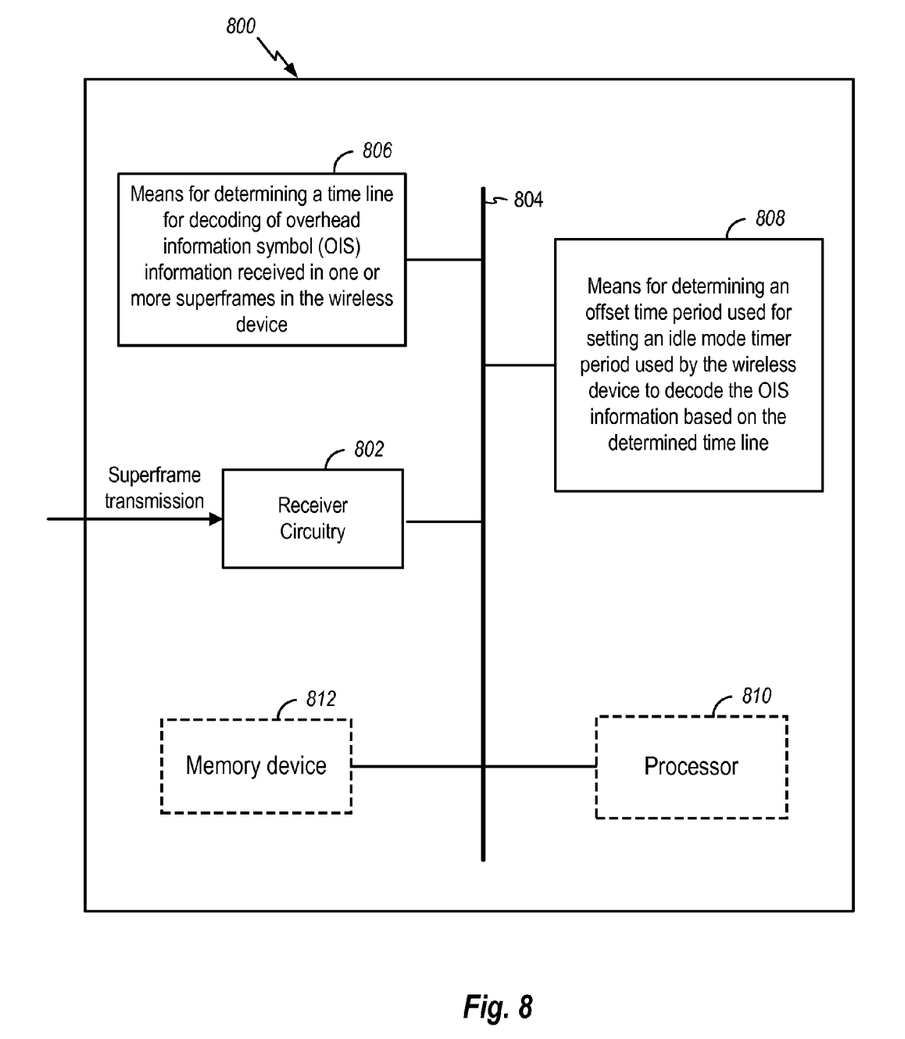
FIG. 8 illustrates yet a further apparatus for optimizing idle mode standby time in a wireless device.

FIG. 8 illustrates yet a further apparatus 800 for optimizing idle mode standby time in a wireless device. Apparatus 800 includes a receiver means or circuitry 802 that receives broadcast superframes from a transmitter. The circuitry 802 communicates the received superframe information to other means or modules in the device via a communication bus 804, or suitable communicative coupling. Apparatus 800 further includes a means 806 for determining a time line for decoding of overhead information symbol (OIS) information received in one or more superframes in the wireless device via circuitry 802. It is noted that processor 608, memory 610, and hardware 612, as one example, may implement means 806. Additionally, although not shown in FIG. 8, means 804 may also includes means for determining a time period m the device needs from being awaken from idle mode to program hardware used in part to decode OIS information in order to latch at the superframe boundary; means for determining a hardware decoding time t that the hardware takes from the superframe boundary to decode OIS information; and means for determining a software decoding time s that a processor running software takes to process OIS information Apparatus 800 also includes means 808 for determining an offset time period used for setting an idle mode timer period used by the wireless device to decode the OIS information based on the determined time line determined by means 806. Means processor 608 and 610 as an example may implement 808, for example. Furthermore, apparatus 800 optionally may include an additional processor 810 for implementing software stored in a memory 812 that performs various operation or processes in carrying out the functionalities of the various other means in apparatus 800.

It is understood that the specific order or hierarchy of methods or steps in the processes and methods disclosed herein is merely an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for use in a wireless device operable in a multicast communication system to maximize stand-by time of the device operable with an idle mode, the method comprising:
    determining a time line for decoding of overhead information symbol (OIS) information received in one or more frames in the wireless device, wherein the determining comprises determining a time m that the wireless device needs from being awaken from the idle mode to program hardware used in part to decode the OIS information in order to latch at a frame boundary, determining a hardware decoding time t that the hardware takes from the frame boundary to decode the OIS information, and determining a software decoding time s that a processor running software takes to process the OIS information; and
    determining an offset time period used for setting a timer period used by the wireless device to decode the OIS information based on the determined time line.

2. The method as defined in claim 1, wherein the offset time period is determined by summing the determined times m, t and s.

3. The method as defined in claim 1, wherein setting the timer period includes subtracting the determined offset time period from a predetermined cycle period.

4. The method as defined in claim 3, wherein the predetermined cycle period comprises a min monitor timer period predefined according to the multicast communication system.

5. The method as defined in claim 1, further comprising:
    putting the wireless device into a sleep mode for a duration of the timer period set using the determined offset time period.

6. The method of claim 1, wherein the multicast communication system is configured to broadcast one or more streams each comprising at least one of audio data, video data, text data, and signaling data.

7. An apparatus for use in a wireless device operable in a multicast communication system to maximize stand-by time of the device operable with an idle mode, the apparatus comprising:
    means for determining a time line for decoding of overhead information symbol (OIS) information received in one or more frames in the wireless device, wherein the determining comprises determining a time m that the wireless device needs from being awaken from the idle mode to program hardware used in part to decode the OIS information in order to latch at a frame boundary, determining a hardware decoding time t that the hardware takes from the frame boundary to decode the OIS information, and determining a software decoding time s that a processor running software takes to process the OIS information; and
    means for determining an offset time period used for setting a timer period used by the wireless device to decode the OIS information based on the determined time line.

8. The apparatus as defined in claim 7, wherein the offset time period is determined by summing the determined times m, t and s.

9. The apparatus as defined in claim 7, including a means for setting the timer period by subtracting the determined offset time period from a predetermined cycle period.

10. The apparatus as defined in claim 9, wherein the predetermined cycle period comprises a min monitor timer period predefined according to the multicast communication system.

11. The apparatus as defined in claim 7, further comprising:
    means for putting the wireless device into a sleep mode for a duration of the timer period set using the determined offset time period.

12. The apparatus of claim 7, wherein the multicast communication system is configured to broadcast one or more streams each comprising at least one of audio data, video data, text data, and signaling data.

13. An apparatus for use in a wireless device operable in a multicast communication system to maximize stand-by time of the device operable with an idle mode, the apparatus comprising:
    at least one processor configured to:
        determine a time line for decoding of overhead information symbol (OIS) information received in one or more frames in the wireless device by determining a time m that the wireless device needs from being awaken from the idle mode to program hardware used in part to decode the OIS information in order to latch at a frame boundary, determining a hardware decoding time t that the hardware takes from the frame boundary to decode the OIS information, and determining a software decoding time s that a processor running software takes to process the OIS information; and
        determine an offset time period used for setting a timer period used by the wireless device to decode the OIS information based on the determined time line.

14. The apparatus as defined in claim 13, wherein the offset time period is determined by summing the determined times m, t and s.

15. The apparatus as defined in claim 13, wherein setting the timer period includes subtracting the determined offset time period from a predetermined cycle period.

16. The apparatus as defined in claim 15, wherein the predetermined cycle period comprises a min monitor timer period predefined according to the multicast communication system.

17. The apparatus as defined in claim 13, wherein the at least one processor is further configured to initiate putting the wireless device into a sleep mode for a duration of the timer period set using the determined offset time period.

18. The apparatus of claim 13, wherein the multicast communication system is configured to broadcast one or more streams each comprising at least one of audio data, video data, text data, and signaling data.

19. A computer program product, comprising:
    non-transitory computer-readable medium comprising:
        code for causing a computer to determine a time line for decoding of overhead information symbol (OIS) information received in one or more frames in a wireless device operable with an idle mode in a multicast communication system by determining a time m that the wireless device needs from being awaken from the idle mode to program hardware used in part to decode the OIS information in order to latch at a frame boundary, determining a hardware decoding time t that the hardware takes from the frame boundary to decode the OIS information, and determining a software decoding time s that a processor running software takes to process the OIS information; and
        code for causing a computer to determine an offset time period used for setting a timer period used by the wireless device to decode the OIS information based on the determined time line to maximize stand-by time of the wireless device.

20. The computer program product as defined in claim 19, wherein the offset time period is determined by summing the determined times m, t and s.

21. The computer program product as defined in claim 19, wherein setting the timer period includes subtracting the determined offset time period from a predetermined cycle period.

22. The computer program product as defined in claim 21, wherein the predetermined cycle period comprises a min monitor timer period predefined according to the multicast communication system.

23. The computer program product as defined in claim 19, further comprising:
code for causing a computer to initiate putting the wireless device into a sleep mode for a duration of the timer period set using the determined offset time period.

24. The computer program product of claim 19, wherein the multicast communication system is configured to broadcast one or more streams each comprising at least one of audio data, video data, text data, and signaling data.

25. A method for use in a wireless device operable in a multicast communication system to maximize stand-by time of the device operable with an idle mode, the method comprising:
determining a time line for decoding of overhead information symbol (OIS) information received in one or more frames in the wireless device;
determining an offset time period used for setting a timer period used by the wireless device to decode the OIS information based on the determined time line; and
setting the timer period to a value resulting from subtracting the determined offset time period from a predetermined cycle period.

26. The method as defined in claim 25, wherein determining the time line of decoding of the OIS information comprises:
determining a time m that the device needs from being awaken from idle mode to program hardware used in part to decode OIS information in order to latch at a frame boundary;
determining a hardware decoding time t that the hardware takes from the frame boundary to decode OIS information; and
determining a software decoding time s that a processor running software takes to process OIS information.

27. The method as defined in claim 26, wherein the offset time period is determined by summing the determined times m, t and s.

28. The method as defined in claim 25, wherein the predetermined cycle period comprises a min monitor timer period predefined according to the multicast communication system.

29. The method as defined in claim 25, further comprising:
putting the wireless device into a sleep mode for a duration of the timer period set using the determined offset time period.

30. The method of claim 25, wherein the multicast communication system is configured to broadcast one or more streams each comprising at least one of audio data, video data, text data, and signaling data.

31. An apparatus for use in a wireless device operable in a multicast communication system to maximize stand-by time of the device operable with an idle mode, the apparatus comprising:
means for determining a time line for decoding of overhead information symbol (OIS) information received in one or more frames in the wireless device;
means for determining an offset time period used for setting a timer period used by the wireless device to decode the OIS information based on the determined time line; and
means for setting the timer period to a value resulting from subtracting the determined offset time period from a predetermined cycle period.

32. The apparatus as defined in claim 31, wherein the means for determining the time line of decoding of the OIS information comprises:
means for determining a time m that the device needs from being awaken from idle mode to program hardware used in part to decode OIS information in order to latch at a frame boundary;
means for determining a hardware decoding time t that the hardware takes from the frame boundary to decode OIS information; and
means for determining a software decoding time s that a processor running software takes to process OIS information.

33. The apparatus as defined in claim 32, wherein the offset time period is determined by summing the determined times m, t and s.

34. The apparatus as defined in claim 31, wherein the predetermined cycle period comprises a min monitor timer period predefined according to the multicast communication system.

35. The apparatus as defined in claim 31, further comprising:
means for putting the wireless device into a sleep mode for a duration of the timer period set using the determined offset time period.

36. The apparatus of claim 31, wherein the multicast communication system is configured to broadcast one or more streams each comprising at least one of audio data, video data, text data, and signaling data.

37. An apparatus for use in a wireless device operable in a multicast communication system to maximize stand-by time of the device operable with an idle mode, the apparatus comprising:
at least one processor configured to:
determine a time line for decoding of overhead information symbol (OIS) information received in one or more frames in the wireless device;
determine an offset time period used for setting a timer period used by the wireless device to decode the OIS information based on the determined time line; and
set the timer period to a value resulting from subtracting the determined offset time period from a predetermined cycle period.

38. The apparatus as defined in claim 37, wherein the at least one processor is further configured to determine the time line of decoding of the OIS information, the determination comprising:
determining a time m that the device needs from being awaken from idle mode to program hardware used in part to decode OIS information in order to latch at a frame boundary;
determining a hardware decoding time t that the hardware takes from the frame boundary to decode OIS information; and
determining a software decoding time s that a processor running software takes to process OIS information.

39. The apparatus as defined in claim 38, wherein the offset time period is determined by summing the determined times m, t and s.

40. The apparatus as defined in claim 37, wherein the predetermined cycle period comprises a min monitor timer period predefined according to the multicast communication system.

41. The apparatus as defined in claim 37, wherein the at least one processor is further configured to initiate putting the wireless device into a sleep mode for a duration of the timer period set using the determined offset time period.

42. The apparatus of claim 37, wherein the multicast communication system is configured to broadcast one or more streams each comprising at least one of audio data, video data, text data, and signaling data.

43. A computer program product, comprising:
non-transitory computer-readable medium comprising:
code for causing a computer to determine a time line for decoding of overhead information symbol (OIS) information received in one or more frames in a wireless device operable with an idle mode in a multicast communication system;
code for causing a computer to determine an offset time period used for setting a timer period used by the wireless device to decode the OIS information based on the determined time line to maximize stand-by time of the wireless device; and
code for causing a computer to set the timer period to a value resulting from subtracting the determined offset time period from a predetermined cycle period.

44. The computer program product as defined in claim 43, wherein the code for causing a computer to determine a time line for decoding of the OIS information comprises:
code for causing a computer to determine a time m that the device needs from being awaken from the idle mode to program hardware used in part to decode OIS information in order to latch at a frame boundary;
code for causing a computer to determine a hardware decoding time t that the hardware takes from the frame boundary to decode OIS information; and
code for causing a computer to determine a software decoding time s that a processor running software takes to process OIS information.

45. The computer program product as defined in claim 44, wherein the offset time period is determined by summing the determined times m, t and s.

46. The computer program product as defined in claim 43, wherein the predetermined cycle period comprises a min monitor timer period predefined according to the multicast communication system.

47. The computer program product as defined in claim 43, further comprising:
code for causing a computer to initiate putting the wireless device into a sleep mode for a duration of the timer period set using the determined offset time period.

48. The computer program product of claim 43, wherein the multicast communication system is configured to broadcast one or more streams each comprising at least one of audio data, video data, text data, and signaling data.

* * * * *